United States Patent [19]

Yamagishi

[11] 4,180,115

[45] Dec. 25, 1979

[54] TIRE, TRACTION UNIT AND DEVICE FOR SHIFTING SAID TRACTION UNIT

[76] Inventor: Kesao Yamagishi, 4-18, Chuō 3-Chōme, Ueda City, Nagano Prefecture, Japan

[21] Appl. No.: 782,442

[22] Filed: Mar. 29, 1977

[30] Foreign Application Priority Data

May 21, 1976 [JP] Japan ............................... 51/57910
Sep. 27, 1976 [JP] Japan ............................... 51/114689

[51] Int. Cl.² ...................... B60C 27/00; B60C 27/02
[52] U.S. Cl. ................................ 152/216; 152/225 R; 152/208
[58] Field of Search .................. 152/216, 208, 225 R, 152/221, 223

[56] References Cited

U.S. PATENT DOCUMENTS

| 2,456,544 | 12/1948 | Varner | 152/225 R |
|---|---|---|---|
| 2,537,231 | 1/1951 | Necrason | 152/208 |
| 2,598,851 | 6/1952 | Spevak | 152/225 R |
| 2,900,002 | 8/1959 | Ecker | 152/216 |
| 3,043,356 | 7/1962 | Mayhercy | 152/208 |
| 3,079,971 | 3/1963 | Iaquinta | 152/208 |
| 3,683,990 | 8/1972 | Detwiler | 152/225 R |
| 3,794,093 | 2/1974 | Boscaino | 152/208 |
| 3,861,752 | 1/1975 | Thurre et al. | 152/216 |
| 3,911,984 | 10/1975 | West | 152/208 |

Primary Examiner—Albert J. Makay
Assistant Examiner—Lawrence E. Williams
Attorney, Agent, or Firm—Armstrong, Nikaido, Marmelstein & Kubovcik

[57] ABSTRACT

The present invention is primarily for providing traction for the tires of automotive vehicles in particular on snow and ice surfaces. The tire generally comprises pairs of deep and shallow channels in close proximity with each other around said tire to extend transversely from the side walls thereof toward a tread portion, said pairs being uniformly spaced at intervals around the periphery of said tire. The tire of the invention includes traction units which are always recessed in the deep channels to provide no traction, and when the traction units are disposed in the shallow channels, they provide effective traction. In addition, the invention comprises a device for converting from one type of tire to another and also a mechanism having a pneumatic bumper for protecting a supporting unit and a shifting unit from breakage when a tire is punctured.

6 Claims, 7 Drawing Figures

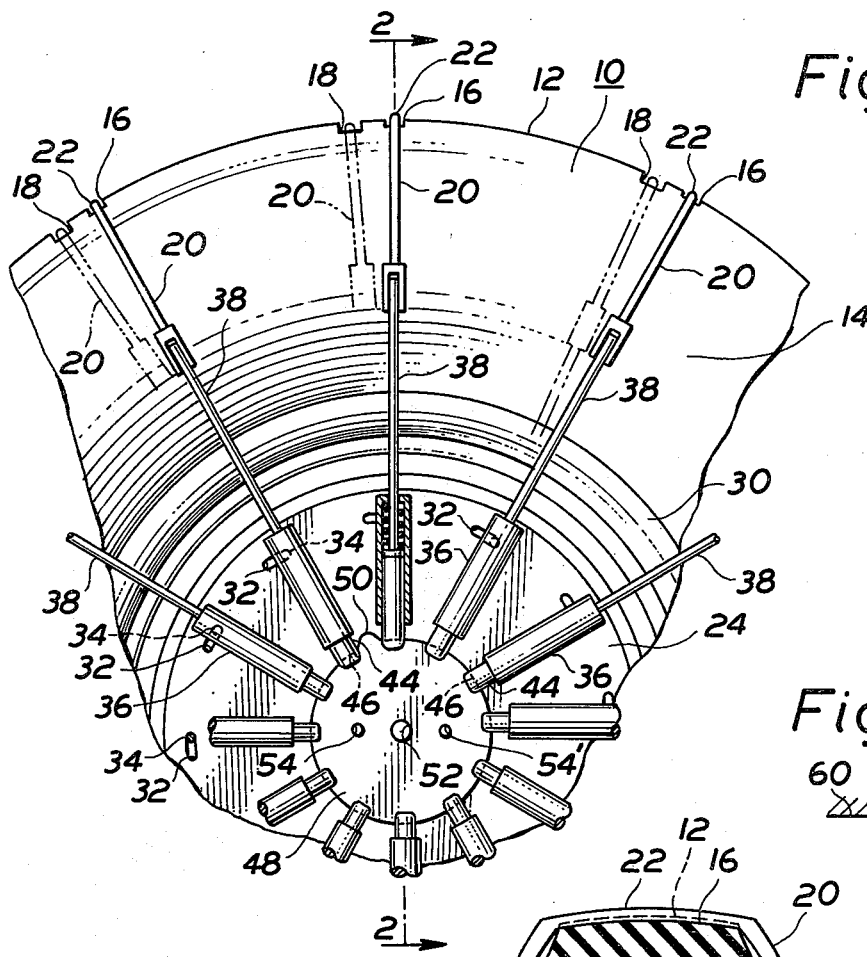
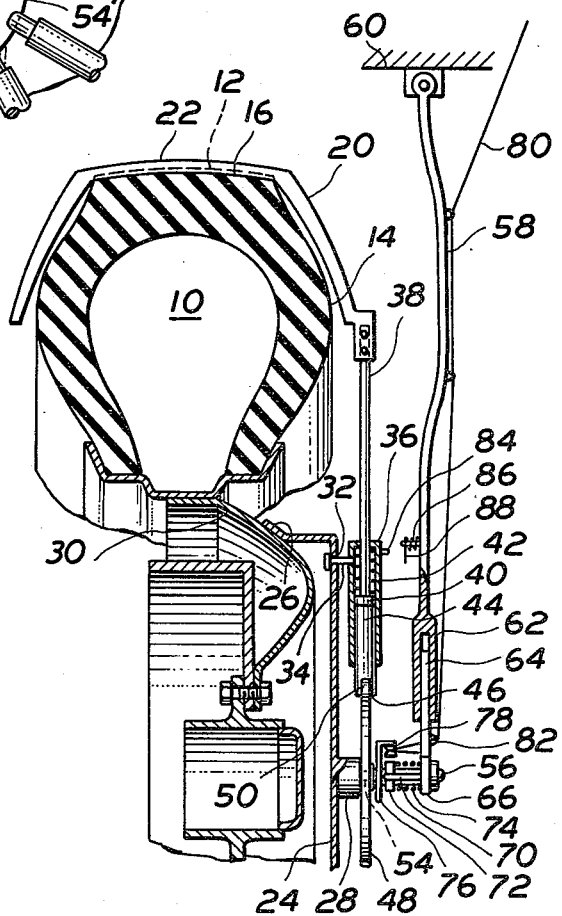
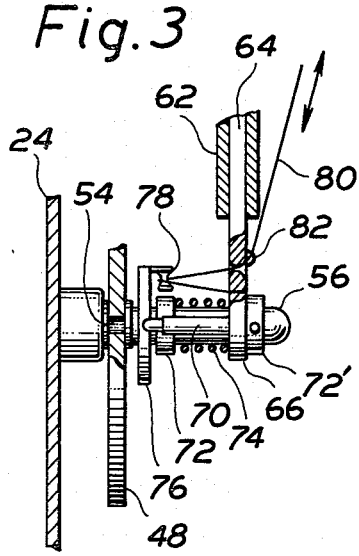

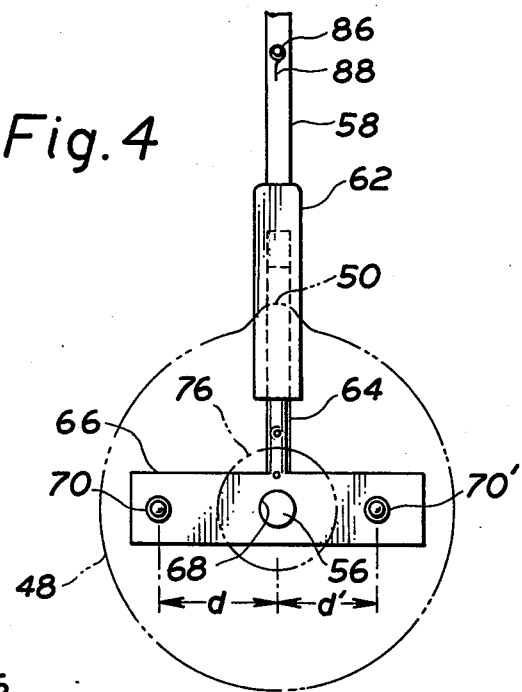
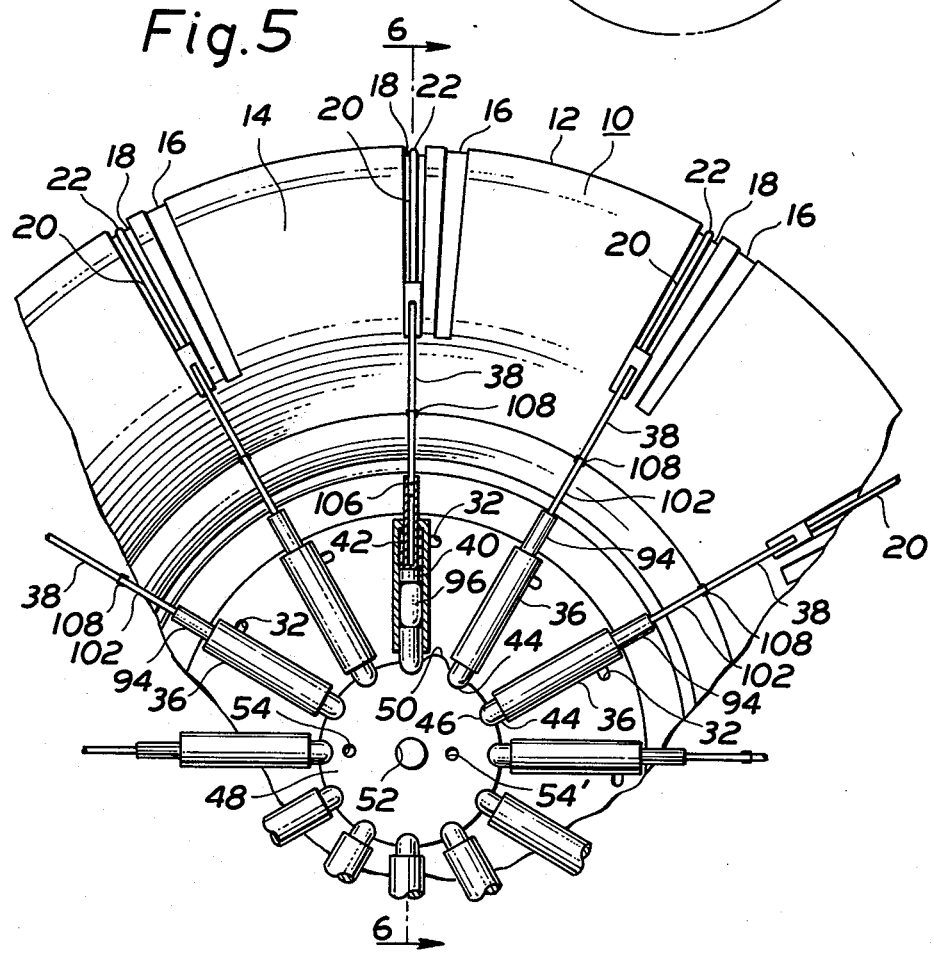

TIRE, TRACTION UNIT AND DEVICE FOR SHIFTING SAID TRACTION UNIT

FIELD OF THE INVENTION

The present invention relates in general to a vehicle tire, a traction unit and a device for shifting said traction unit from one channel into another channel for providing traction in a rapid manner. More particularly, the present invention is directed to a device for slidably and selectively shifting traction units in a position to provide traction and in another position the traction units are recessed so that they do not provide traction.

DESCRIPTION OF THE PRIOR ART

There have been developed different types of apparatuses to provide additional traction for vehicle tires on snow and ice surfaces. The most common efficient device in use today is the conventional tire chain or some variation thereof, installation and removal of which is not only difficult and time consuming, but also distasteful because of necessity for reaching over or around the tire, for jacking up said tire, and also for placement and the association with snow or ice encountered in such operations.

SUMMARY OF THE INVENTION

It is an object of the invention to provide a novel tire which may be readily converted into a snow tire having several sets of deep and shallow channels around a periphery of the tire.

It is another object of the invention to provide a novel tire having traction units disposed in the channels and capable of having an operative position and an inoperative position so that said tire is applicable to all road hazards and conditions without subjecting the traction units to unnecessary wear.

It is still another object of the invention to provide a device for slidably and selectively shifting traction units from deep channels into shallow channels to provide traction and also putting back the traction units from the deep channels into the shallow channels wherein the traction units are recessed so that said traction units do not provide traction.

It is a still further object of the invention to provide a device for preventing a supporting unit of the traction units and a shifting unit from breaking when a tire is punctured.

It is yet another object of the invention to provide a device for easily shifting the traction units without jacking up the vehicle.

It is still another object of the invention to provide a device for readily converting from one type of tire to another by only operating a control cable from a driver's seat, which eliminates difficulty and distastefulness associated with installation and removal of existing apparatuses on the market today.

BRIEF DESCRIPTION OF DRAWINGS

FIG. 1 is a partial side elevational view of the traction units of a first embodiment of the present invention, partially in section, in place on a tire, and showing the traction units in their operative position;

FIG. 2 is a sectional view taken along the lines 2—2 of FIG. 1 and also provided with an operating means of the invention;

FIG. 3 is an enlarged sectional view of the operating means shown in FIG. 2;

FIG. 4 is an enlarged side elevational view of the operating means shown in FIG. 3;

FIG. 5 is a partial side elevational view of another embodiment, showing the traction units in their inoperative position;

DESCRIPTION OF THE PREFERRED EMBODIMENT

Figure 6:
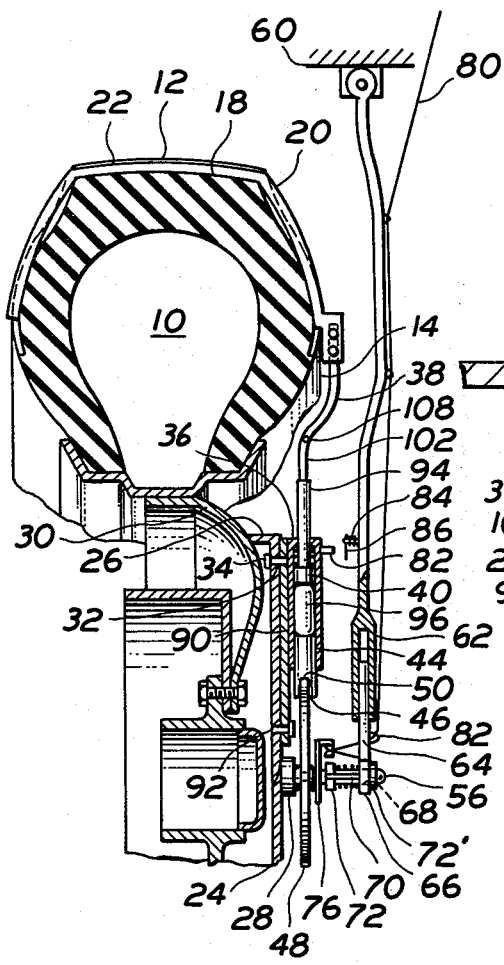
FIG. 6 is a sectional view taken along the line 5—5 of FIG. 5 and also provided with the same operating means as that of the first embodiment shown in FIGS. 1-4, but with a traction unit in its operative position.

Referring to the drawings in detail, wherein like numerals indicate like elements, there is shown in FIGS. 1, 2, 5 and 6, a tire designated generally as 10. A pair of a shallow channel 16 and a deep channel 18 in close proximity with each other are provided around the tire 10 to extend transversely from the side walls thereof toward a tread portion 12. A plurality of the pairs of the shallow and deep channels are uniformly spaced at intervals around the tire 10. The shape of the shallow channels 16 is substantially the same as that of the deep channel 18, and the number of the pairs of the shallow and deep channels may be preferably 6 or 9. It will be appreciated that a greater or lesser number of channels may be provided as desired.

A reference numeral 20 represents a traction unit having a curved section 22 shaped to fit over and partially around an outer area of the tire 10 perpendicular to the periphery thereof and also to be disposed within the channels 16 and 18. A surface contacting area 22 of the traction unit 20 is so shaped into a vertex as to provide traction. The traction unit 20 may preferably be formed of malleable cast iron.

A metallic disc 24 having an inwardly extending peripheral wall 26 and a hub 28 on its outer surface is rigidly mounted onto an outer surface of a wheel 30 with said peripheral wall welded thereto so that said hub is located at a central portion of the wheel 30. The metallic disc 24 is provided with a plurality of arcuate slots 32 at uniformly spaced portions and adjacent the peripheral wall 26 to coincide with a midportion between each pair of the shallow and deep channels 16, 18.

A rocking pin 34 is slidably penetrated through each arcuate slot 32 to extend outwardly beyond the disc 24.

An inner side wall portion adjacent a top of a hollow cylinder 36 closed at its top portion is secured to an outer end portion of the rocking pin 34 so that the cylinder may be partially rocked together with the rocking pin slidable within the arcuate slot 32.

A top end portion of a piston rod 38 is rigidly connected to a lower end portion of the outer end of the traction unit 20, a lower end portion of said rod inserted reciprocally into the cylinder 36 is provided with a piston 40 and a spiral tension spring 42 is wound around a lower end portion of the rod 38 to exert a force against a lower face of the top end portion of the hollow cylinder 36 and an upper face of the piston 40.

A lifter rod 44 having a slit 46 parallel with the disc 24 and at its lower end portion is radially and slidably inserted into the cylinder 36.

A main spindle 56 is perpendicularly secured to a central portion of the hub 28 to extend outwardly. A cam disc 48 having a thickness to snugly fit into the slit 46 of the lifter rod 44 is provided with a half oval cam 50 at a periphery thereof. The spindle penetrates into a central opening 52 of the cam disc 48 to mount the cam rotatably and parallelly with the disc 24. In addition, a pair of small openings 54 and 54' are provided diametrically through the cam disc 48, and as shown in FIG. 4, a distance "d" between the opening 54 and the central opening 52 is slightly greater than a distance "d'" between the opening 54' and the central opening 52.

A supporting shaft 58 is longitudinally and rockingly mounted adjacent and alongside the piston rod 38 and the traction unit 20, a top end of said supporting shaft being pivotally connected to a fender 60 of the vehicle.

A hollow cylinder 62 closed at its top end is rigidly secured to a lower end portion of the supporting shaft 58 to locate adjacent and alongside the cylinder 36. A connecting rod 64 fittingly inserted into the cylinder 62 is integrally provided with a lateral operating plate 66 at its lower end portion to form an inverted T-shape portion. The operating plate 66 is provided with a central opening 68 for allowing the perpendicular spindle 56 to penetrate therethrough.

Figure 7:
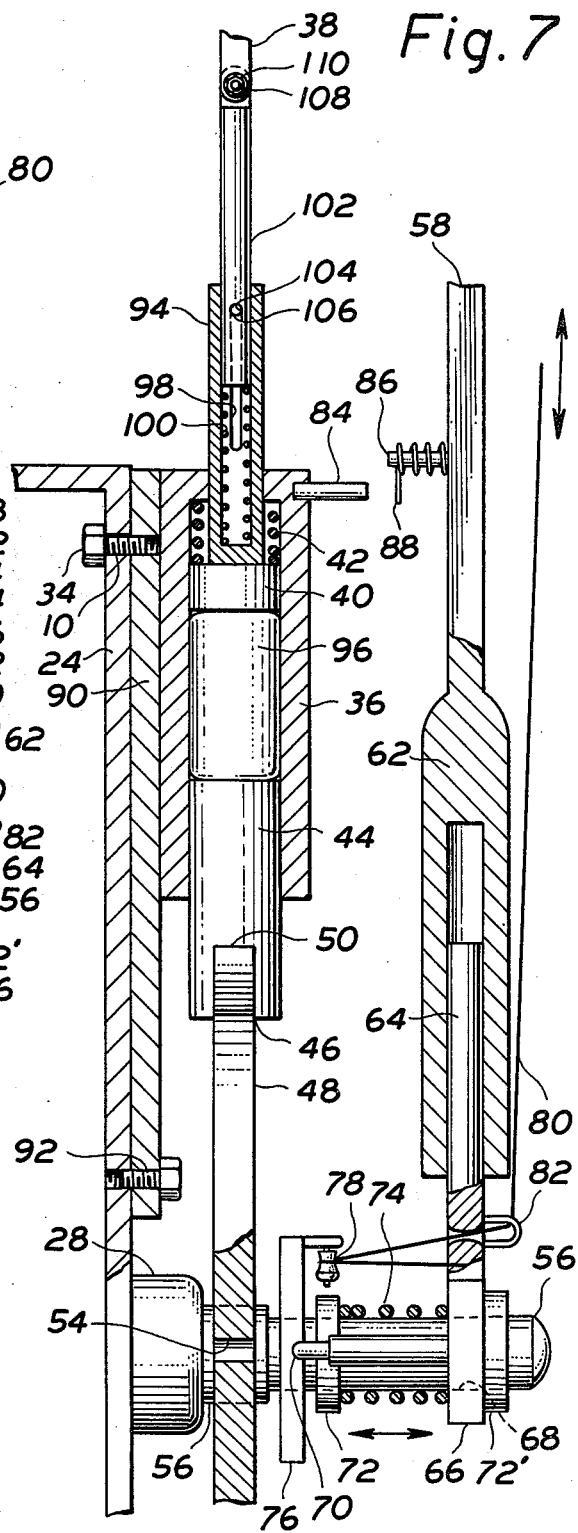
FIG. 7 is an enlarged sectional view of the operating means of FIG. 6.

In addition, a pair of perpendicular spindles 70 and 70' are protruded inwardly on an inner face of the operating plate 66 and at the portions corresponding to the pair of small openings 54 and 54' of the cam disc 48. As shown in FIGS. 3 and 7, the spindles 70 and 70' can be snugly inserted into the openings 54 and 54' of the cam disc 48 when the cam 50 of the cam disc 48 is rotated to dispose at a top peripheral portion since the distance "d" on the disc 48 is different from the distance "d'".

A wheel 76 is rotatably mounted onto the main spindle 56 in close proximity to the cam disc 48, and a fixed wheel 72 is mounted onto said spindle and adjacent the main wheel 76. A coil spring 74 is wound around the main spindle 56, which penetrates through the central opening 68 of the T-shaped operating plate 66, and another fixed wheel 72' is mounted onto the main spindle 56 at its outer end portion so that the operating plate 66 slidable along the main spindle 56 is always kept at the outermost position.

As particularly shown in FIG. 3, a small idler 78 is provided at a top peripheral edge on an outer face of the wheel 76. A control cable 80 connected to a lower end portion of the connecting rod 64 is wound around the idler 78, then penetrated through the rod and a ring 82 secured to an outer face of said rod and elongated upwardly alongside the supporting shaft 58 into a driver's cab (not shown). When the cable 80 is pulled upwardly from the cab, the operating plate 66 is shifted inwardly against the coil spring 74. On the other hand, when the cable 80 is loosened, the operating plate 66 returns to the outer original position and it is stopped by the outer fixed wheel 72'.

In order to facilitate the rocking movement of the cylinder 36, a lug 84 is outwardly secured to a side face adjacent a top portion of the cylinder 36, a spring pin 86 having a coil spring 88 thereon is inwardly secured to an inner face of the supporting shaft 58 to correspond to the lug 84 and an inner end of the coil spring 88 is always projected downwardly in close proximity to said lug. In consequence, when the cam disc 48 is rotated clockwise together with the rotation of the tire 10, the lifter rod 44 is pushed upwardly by the cam 50 of the cam disc 48 to push up the piston 40 against the spring 42 so that the traction unit 20 fitted into the shallow channel 16 is lifted, and the cylinder 36 is rocked counterclockwise to slidably shift the traction unit 20 into the deep channel 18 wherein said traction is disposed below the level of the tread portion 12 to provide no traction. Then the cylinder 36 is rocked counterclockwise by the rocking pin 34 until said rocking pin is made in contact with a left end portion of the arcuate slot 32.

When the lower end of the lifter rod 44 passes beyond the cam 50 of the cam disc 48, the traction unit 20 is pushed up radially by the supporting shaft 38, which is also pushed up by the piston 40 and the lifter rod. When the lower end of the lifter rod 44 comes to the basic periphery of the cam disc 48, said lifter rod descends radially to pull down the piston 40 and the supporting shaft 38 so that the traction unit 20 integral therewith is counterclockwise and slidably shifted to fit into the deep channel 18 wherein said traction unit is disposed below the level of the tread portion 12. Therefore, the further clockwise rotation of the cam disc 48 together with the rotation of the tire 10 shifts the other traction units 20 into the deep channels 18 one by one, thus converting the "snow tire" into the ordinary tire.

In operation, when the vehicle is moved very slowly in a forward or rearward direction to rotate the tire 10, the traction units 20 disposed within either shallow channels 16 or within the deep channels 18 are forced to rotate with the cam disc 48 until the control cable 80 is pulled up from the driver's cab. In case the cable 80 is pulled up, the supporting shaft 58 and the cylinder 62 are shifted inwardly to make the spindles 70 and 70' on the plate 66 in contact with the cam disc 48. When said cam disc is rotated to locate its cam 50 at its top position, the spindles 70 and 70' are inserted into the openings 54 and 54' of the cam disc, thus locking said disc against rotation.

Accordingly, through the rotation of the tire 10, the cam 50 of the cam disc 48 thus locked pushes up the lifter rod 44, the piston 40 and the shaft 38 to slidably shift the traction unit 20 into either shallow channel 16 or deep channel 18. Like this way, all of the traction units 20 are automatically and slidably shifted into either shallow channels 16 or deep channels 18 respectively. The tire 10 is adapted to have an operative disposition when the traction unit 20 is disposed within the shallow channel 16 and an inoperative disposition when said traction unit is disposed within the deep channel 18.

During the above movement, the lug 84 secured to the side face of the cylinder 36 is sprung laterally by the coil spring 88 so that the cylinder may be readily rocked with the pin 34 to facilitate the slidable shifting of the traction unit 20 around the narrow periphery between the shallow channel 16 and the deep channel 18.

Referring to FIGS. 5-7 showing another embodiment of the invention, a plurality of supporting plates 90 are slidably placed on the metallic disc 24 to position on each arcuate slot 32 and also to extend radially from a portion near the hub 28 to a periphery of the disc 24, thus covering each arcuate slot 32. A portion adjacent the lower end portion of the supporting plate 90 is pivoted by a bolt 92 onto the disc 24, while an outer end of the rocking pin 34 slidably penetrating the arcuate slot 32 is rigidly secured to a corresponding portion of the plate 90 adjacent its periphery.

As particularly shown in FIGS. 5, 6 and 7, a hollow cylinder 36 having the same construction as that of the first embodiment is rigidly secured onto each slidable supporting plate 90. A hollow slender cylinder 94 closed at a lower end is inserted into the cylinder 36 to reciprocate therein and a tension spring 42 wound around the cylinder 94 urges a piston 40 rigidly secured to said cylinder and a lower face of the top closed portion of the cylinder 36 to pull the traction unit 20 radially.

A compressed air-filled cylindrical pneumatic bumper 96 is snugly fitted within the cylinder 36, and a lifter rod 44 having a slit 46 is fitted into said cylinder so that the pneumatic bumper 96 is interposed between the piston 40 and the lifter rod 44. A spindle 56 perpendicularly and outwardly extending from a central portion of a hub 28 is penetrated into a central opening 68 of a cam disc 48 to mount said cam rotatably and parallelly with the disc 24. Like the first embodiment, the cam disc 48 has a thickness to snugly fit into the slit 46 of the lifter rod 44 and also a half oval cam 50 at a peripheral portion of said disc.

A pair of narrow guide grooves 98 are diametrically and longitudinally provided along an inner periphery of the slender cylinder 94 to its substantial length and a compression spring 100 is inserted into said cylinder. A piston rod 102 sized to slidably fit into the slender cylinder 94 and having a connecting pin 106 penetrating through a central and lateral opening 104 of said cylinder to project beyond its periphery is reciprocally inserted into said cylinder so that both ends of the connecting pin 106 are fitted into the grooves 98 to allow a longitudinally slidable movement of the piston rod 102. Meanwhile, a top end portion of the piston rod 102 is rigidly connected to a lower end portion of the supporting shaft 38 by a conventional bolt 108 and a nut 110.

In accordance with the second embodiment of the present invention, even if the tire 10 is given a considerable shock to deform by a difference of air pressure within the tire, a heavy load or a bounding on a rough ground during taxiing, such a shock can be readily absorbed by the pneumatic bumper 96 to cause no trouble. In the worse case, when the tire 10 is rapidly deformed by a puncture during taxiing to give a considerable pressure to said tire, the pneumatic bumper 96 is firstly punctured to render shock absorption to said tire or the piston rod 102 is forced to slip down into the slender cylinder 94 with the pin 106 sliding through the peripheral grooves 98, the piston rod 40, lifter rod 44, cam disc 48, spindle 56 and relevant means are protected by the shock absorption rendered by the pneumatic bumper 96, the cylinder 94 and the rod 102.

The present invention may be embodied in other specific forms without departing from the spirit or essential attributes thereof and, accordingly, reference should be made to the appended claims, rather than to the foregoing specification as indicating the scope of the invention.

I claim:

1. A tire which comprises a plurality of pairs of shallow and deep channels provided in close proximity with each other around said tire to extend transversely from the side walls thereof toward a tread portion, said pairs of the shallow and deep channels being uniformly spaced at intervals around the periphery of said tire, said shallow channel being of substantially the same shape as the deep channels, said deep channels receiving a traction unit in its inoperative position, and said shallow channels for receiving the traction unit in its operative position.

2. A traction unit adapted for application to the periphery of a vehicle tire having at least one pair of deep and shallow channels, said traction unit comprising a curved section shaped to fit over the periphery thereof in a direction perpendicular to the plane of the tire and also control means for remotely actuating said traction unit to selectively dispose said curved section within either the deep channel or the shallow channel provided in the tire.

3. A device for providing improved traction for a vehicle which comprises a traction unit adapted to be selectively disposed either within a deep channel or within a shallow channel, a metallic disc having an inwardly extending peripheral wall and rigidly mounted onto an outer surface of a wheel with said peripheral wall secured onto said wheel and having a hub at a central portion on an outer surface of said wheel, said metallic disc being provided with a plurality of arcuate slots at uniformly spaced intervals and adjacent the peripheral wall to coincide with a midportion between each pair of the shallow and deep channels, a rocking pin slidably penetrated through each arcuate slot to extend outwardly beyond the disc, a hollow cylinder closed at its top portion and secured to an outer end portion of said rocking pin to be partially rocked together with said rocking pin, a piston rod having a piston at its lower end portion and reciprocally inserted into said hollow cylinder, a top end portion of said piston rod being rigidly connected to an outer lower end portion of said traction unit, a spiral spring wound around a lower end portion of said piston rod to exert a lower face of the top end portion of the hollow cylinder and an upper face of said piston, a lifter rod having a slit which is parallel with the disc at its lower end portion to be radially and slidably inserted into said hollow cylinder, a main spindle perpendicularly secured to a central portion of the hub, a cam disc having a thickness to snugly fit into the slit of the lifter rod, a half oval cam at a periphery thereof and a central opening, said cam disc being rotatably mounted onto the main spindle to be parallel with the disc by penetrating said main spindle into the central opening of said cam disc, thus snugly fitting a peripheral edge of the cam disc into the slit of the rod to push up the lifter rod into the cylinder, said cam disc being provided with a pair of small openings diametrically in such a way that a distance "d" between one small opening and the central opening is slightly greater than a distance "d'" between another small opening and the central opening, a supporting shaft mounted longitudinally and rockingly adjacent and alongside the piston rod and the traction unit, a top end of said supporting shaft being pivotally connected to a fender of the vehicle, a hollow cylinder closed at its top end and rigidly secured to a lower end portion of the supporting shaft to locate adjacent and alongside said hollow cylinder, a connecting rod fittingly inserted into the cylinder, said connecting rod being integrally provided with a lateral operating plate at its lower end portion to form an inverted T-shape portion, said operating plate being provided with a central opening for allowing the perpendicular spindle to penetrate therethrough, a pair of perpendicular spindles being protruded on an inner face of the operating plate and at the portions corresponding to the pair of small openings of the cam disc, said spindles being snugly insertable into the openings of the cam disc when the cam of the cam disc is rotated to dispose at a top peripheral position, thus locking the cam disc and also permitting to push up the lifter rod, a wheel mounted rotatably onto the main spindle in close proximity to the cam disc, a fixed wheel mounted onto said main spindle and adjacent said main wheel, a coil spring wound around said main spindle, another fixed wheel mounted onto the main spindle at its outer end portion, a wheel having a small idler at a top peripheral edge on an outer face of the wheel and rotatably mounted onto the main spindle in close proximity to the cam disc, and a control cable connected to a lower end portion of the connecting rod and being wound around the idler, penetrated through said rod and elongated upwardly alongside the supporting shaft into a driver's cab whereby said operating plate, to which the main spindle is penetrated, is always kept at the outermost position.

4. A device for slidably and selectively shifting a traction unit as claimed in claim 3 wherein a lug is outwardly secured to a side face adjacent a top portion of the hollow piston cylinder and a spring pin having a coil spring thereon is inwardly secured to an inner face of the supporting shaft to correspond to said lug in such a way that an inner end of the coil spring is always projected downwardly in close proximity to said lug whereby said lug is sprung by the inner end of the coil spring during a partial rocking movement of the supporting shaft so as to facilitate the disposition of said traction units in an operative and an inoperative disposition with respect to said tread portion.

5. A device for slidably and selectively shifting a traction unit as claimed in claim 3 wherein a supporting plate is slidably inserted between the metallic disc and each hollow piston cylinder to position on each arcuate slot and also to extend radially from a hub to a periphery of the metallic disc, and a portion adjacent the lower end of each supporting plate is pivoted by a bolt onto said metallic disc, an outer end of the rocking shaft slidably penetrating the arcuate slot is rigidly secured to a corresponding portion of the supporting plate adjacent its periphery and a hollow piston cylinder whereby the hollow piston cylinder connected to a lower end portion of the traction unit may be easily rocked to shift said traction unit between the deep channel and the shallow channel.

6. A device as claimed in claim 3 which comprises a hollow slender cylinder closed at a lower end reciprocally inserted into a hollow cylinder secured onto a supporting plate, a tension spring wound around said hollow slender to urges a piston and a lower face of the top closed portion of the cylinder to pull the traction unit radially, a compressed air-filled cylindrical pneumatic bumper sized to snugly fit within a piston cylinder, said hollow slender cylinder being provided with a pair of narrow guide grooves provided diametrically and longitudinally along an inner periphery of the slender cylinder to its substantial length, a compression spring inserted into said slender cylinder, a piston rod slidably fitted into said slender cylinder, said piston rod having a connecting pin penetrating through a central and lateral opening of said cylinder to project beyond its periphery whereby shock absorption is rendered to protect a supporting means and a shifting unit and the relevant means from breaking when a tire is punctured.

* * * * *